No. 697,490. Patented Apr. 15, 1902.
G. G. JONES.
CULTIVATOR.
(Application filed Oct. 17, 1901.)
(No Model.)
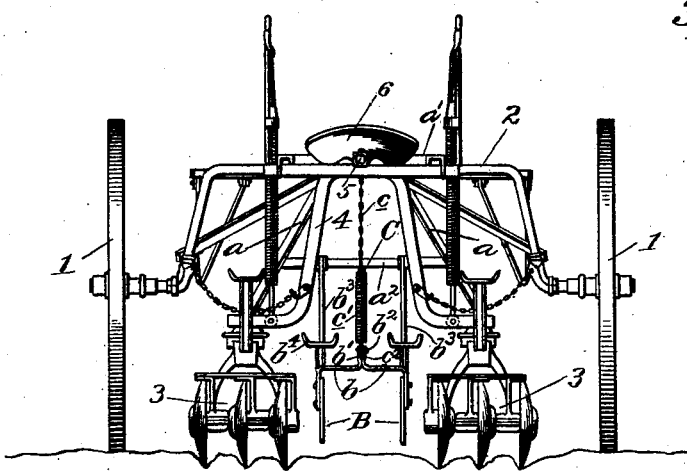
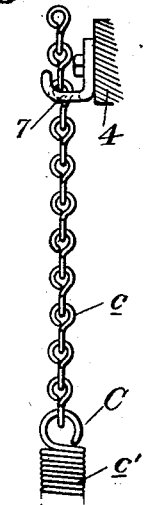
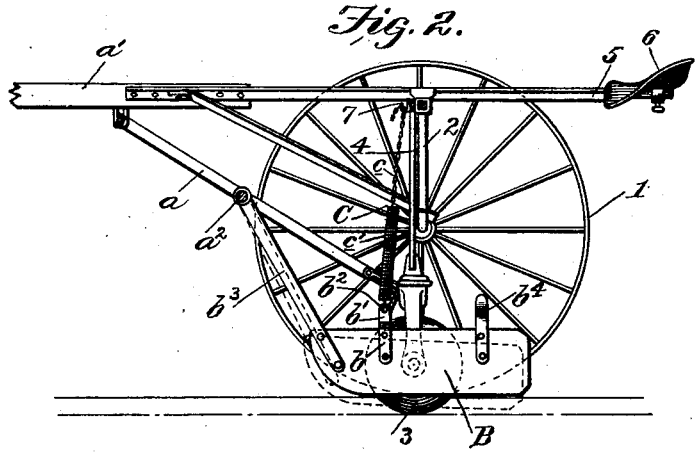
Attest:
G. A. Pennington
George Bakewell
Inventor:
George G. Jones,
by Bakewell & Cornwall
Attys.

UNITED STATES PATENT OFFICE.

GEORGE G. JONES, OF MONTGOMERY, MISSOURI.

CULTIVATOR.

SPECIFICATION forming part of Letters Patent No. 697,490, dated April 15, 1902.

Application filed October 17, 1901. Serial No. 79,009. (No model.)

*To all whom it may concern:*

Be it known that I, GEORGE G. JONES, a citizen of the United States, residing at Montgomery, Missouri, have invented a certain new and useful Improvement in Cultivators, of which the following is a full, clear, and exact description, such as will enable others skilled in the art to which it appertains to make and use the same, reference being had to the accompanying drawings, forming part of this specification, in which—

Figure 1 is a rear elevation of a cultivator having the present invention applied. Fig. 2 is a side elevation thereof, partly in section, the wheel and disk gang at one side of the fender and the parts connected to said wheel and disk gang being removed. Fig. 3 is a detail illustrating the connector between the fender and the frame of the machine, the member by which said connector is supported upon the frame being also shown; and Fig. 4 is a detail front view of said supporting member with a portion of the chain in place thereon.

My invention relates to improvements in cultivators and the like, and more particularly to the fenders thereof, the object being to provide a construction by which the fenders can be quickly and conveniently adjusted in order that the relation of the fenders to the corn or other plants being cultivated can be changed as frequently as may be necessary or desired.

It is well known that in fields of corn, &c., the height of the young plants is more or less uneven; but by adjusting the vertical position of the fender the amount of earth thrown toward the plants can be regulated—that is, for small plants the fender can be moved downwardly, so as to admit a small quantity of earth being thrown toward the plants, while for larger plants the fender can be raised to allow more earth to be thrown toward the plants. It is also well known that in fields that contain more than one kind of soil, as black and white land and sandy loam and clay and prairie soil, no plow pitches two different soils exactly alike; but by adjusting the fenders the regular amount of earth can be thrown to the plants, and, again, the drain on some fields is irregular, thus allowing some parts of the field to dry sooner than others. In this case the plow invariably pitches the dampest soil to a greater degree than the drier dirt. By adjusting the fenders the plow will throw the different kinds of earth to the plants with regularity.

With this object in view my invention consists in the construction, arrangement, and combination of the several parts, all as will hereinafter be described and afterward pointed out in the claims.

Referring now more particularly to the drawings, 1 1 represent the wheels of a cultivator, 2 the arch upon which said wheels are journaled, 3 3 the disk gangs, 4 the arch upon which said disk gangs are supported, 5 the seat-bar, and 6 the driver's seat upon said bar, said parts being constructed and arranged in a well-known manner.

Brace-beams $a$ extend obliquely between the disk-gang supports and a suitable portion of the machine, (as the main beam $a'$,) and connected to said braces at a suitable point is a cross-bar $a^2$. Between the gangs of disks and suitably spaced from each other are fender-plates B, whose vertical positions determine the amount of dirt thrown upon the plant, as is well understood, and said fenders are connected to each other by means of strap-irons $b$, each of which is connected to one of the fender-plates, near the top thereof, and extends inwardly, said straps having struck-up inner ends $b'$, which are secured together, as by a bolt $b^2$. A link $b^3$ is connected to the forward end of each fender-plate and extends forwardly and upwardly to the cross-bar $a^2$, upon which said links are pivotally supported. The fender-plates can thus swing upon said cross-bar as a pivot, whereby the height of the fender with relation to the ground can be varied and the amount of dirt thrown under the plates and upon the plant by the disks can be correspondingly regulated.

Upon the arch 4, which connects the disk gangs, is a bifurcated hook 7, of well known construction, and attached to the fender and adapted to be engaged by said hook is a connector C, by means of which the fender is supported in raised position. The upper portion of said connector is a chain $c$, whose links can be inserted between the fingers of said hook 7 and supported thereon in a well-known manner, while between said chain and the fender is a coiled spring $c'$, said spring being connected to the chain and fender in any suitable manner. I prefer, however, to provide the lower end of the spring with a plate $c^2$, having an opening $c^3$ therethrough, and to place said plate between the struck-up ends of the straps $b$, the bolt which secures said strap ends together also passing through said plate. Upon the fender-plates are upwardly-extending foot-rests $b^4$, said rests being in advance of the driver's seat and such a distance therefrom that they can be engaged by the feet of the driver.

In using the above-described cultivator the chain $c$ is so adjusted upon the hook 7 that the fender will be supported at the maximum height at which it is desired to support said fender during the cultivation of the particular field which is to be operated upon. The fender is, however, because of the spring $c'$ in the connector, yieldingly supported at such height, so that the driver can at any time by placing his foot upon one of the foot-rests $b^4$ depress the fender to any extent that may be desired, the fender being returned to its raised position as soon as the pressure is removed. Thus the vertical position of the fender can be quickly and conveniently adjusted with great nicety, and just the desired amount of dirt can be thrown upon the various plants.

I have herein shown and described the present invention as applied to a disk cultivator. It will be apparent, however, that any suitable means for throwing or turning and throwing the dirt can be substituted for the disks without in the least departing from the spirit of my invention. Furthermore, I am aware that many minor changes in the construction, arrangement, and combination of the several parts of my device can be made and substituted for those herein shown and described without in the least departing from the nature and principle of my invention.

It will be obvious that instead of hinging the links $b^3$ to the cross-bar $a^2$ the forward ends of said links can be pivotally connected directly to the brace-beams $a$, thus dispensing with the cross-bar $a^2$. In fact this connection might be considered simpler and more easily made.

Having thus described my invention, what I claim as new, and desire to secure by Letters Patent, is—

1. In a cultivator or the like, means for throwing the dirt, a vertically-movable fender supported at the sides of said means and in operative relation thereto, a spring adjustably supporting said fender with relation to said means for throwing the dirt and tending at all times to hold said fender in an elevated position, and a foot-rest by means of which the fender may be depressed against the action of the spring; substantially as described.

2. In a cultivator or the like, means for throwing the dirt, a fender vertically movable at the side of said means and in operative relation thereto, and a spring connected to said fender and a relatively fixed portion of the cultivator and adjustably supporting said fender with relation to said means for throwing the dirt, whereby said fender is yieldingly supported in an elevated position; substantially as described.

3. In a cultivator or the like, means for throwing the dirt, a fender vertically movable at the side of said means and in operative relation thereto, and a connector between said fender and a relatively fixed portion of the cultivator and adjustably supporting said fender with relation to said means for throwing the dirt, said connector including a spring attached to the fender and a chain adjustably connected to said fixed portion of the cultivator; substantially as described.

4. In a cultivator or the like, a frame including an arch, disk gangs supported upon said arch, forwardly-extending braces between the supports for said gangs and a suitable portion of said frame, suitably-spaced fender-plates between said gangs, links secured to said plates and pivotally supported by said braces, straps upon said fender-plates and having inwardly-extending portions with struck-up ends, a plate having an opening therethrough between said strap ends, a securing member extending through said strap ends and the said plate, a spring secured to said plate, a chain secured to said spring, a member upon the said arch to which said chain is adjustably connected, and a seat upon the frame and so related to said fender-plates that said plates can be depressed by the foot of a person seated upon said seat; substantially as described.

In testimony whereof I hereunto affix my signature, in the presence of two witnesses, this 12th day of September, A. D. 1901.

GEORGE G. JONES.

Witnesses:
CLAUDE R. BALL,
LEIGH H. ADAMS.